INVENTOR.
GEORGE D. LEE

BY *Fraser & Bogucki*

ATTORNEYS

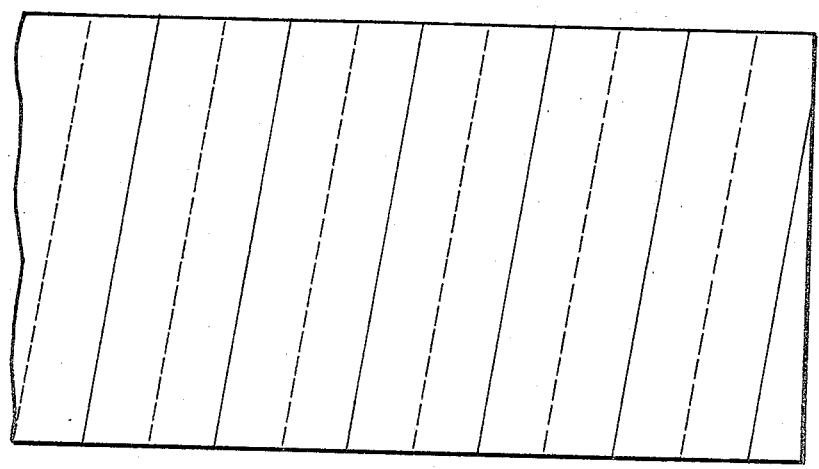
FIG.—6
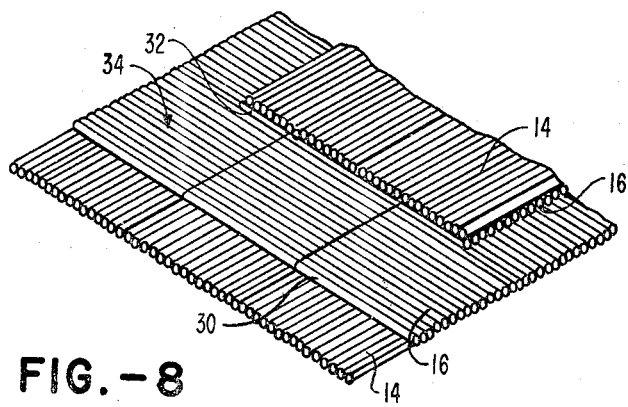
FIG.—8
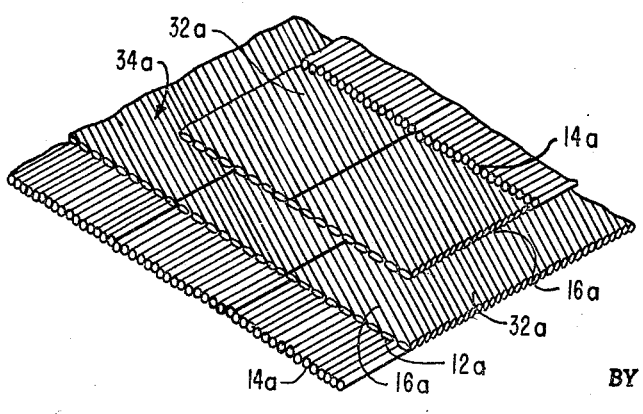
FIG.—9
INVENTOR.
GEORGE D. LEE
BY
ATTORNEYS Jan. 20, 1970     G. D. LEE     3,490,983
FIBER REINFORCED STRUCTURES AND METHODS OF MAKING THE SAME
Filed May 17, 1965     6 Sheets-Sheet 4

INVENTOR.
GEORGE D. LEE
BY

ATTORNEYS

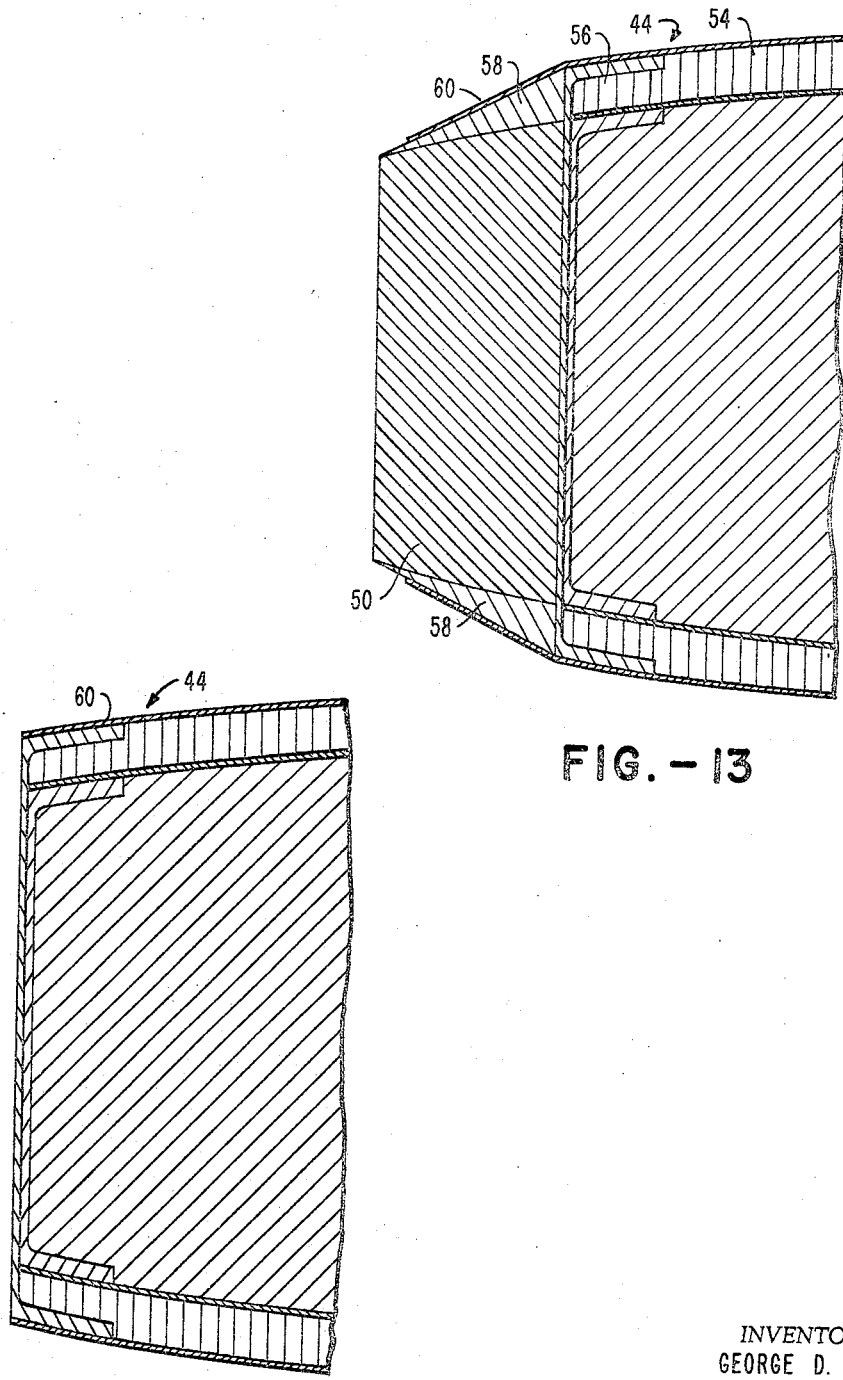
FIG.—13
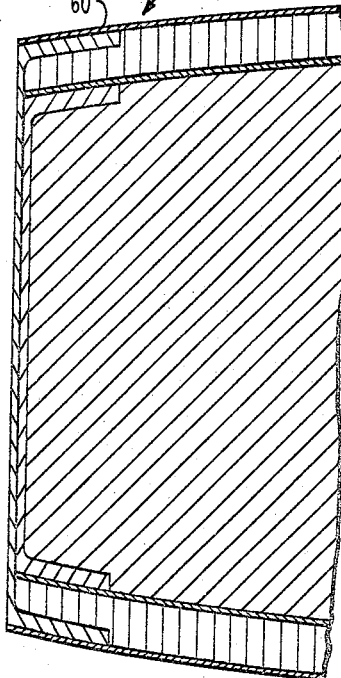
FIG.—14

United States Patent Office 3,490,983
Patented Jan. 20, 1970

3,490,983
FIBER REINFORCED STRUCTURES AND METHODS OF MAKING THE SAME
George D. Lee, Monterey Park, Calif., assignor to Hitco, Gardena, Calif.
Filed May 17, 1965, Ser. No. 456,126
Int. Cl. B32b 5/22, 5/12; B65h 81/00
U.S. Cl. 161—59                                  7 Claims

ABSTRACT OF THE DISCLOSURE

A non-woven oriented fiber reinforcement comprises a plurality of layers of tape winding, wherein each layer consists of successive abutting turns of non-woven oriented cross-ply fiber tape comprising two joined sheets, one of which sheets comprises at least partially transverse fibers, wherein the layers are disposed in pairs in the reinforcement with the sheets of the transverse fibers in each respective pair being in facing relation to one another and wherein the turns of one layer overlap the turns of the other layer, so that the lines of abuttment of the turns of the underlying layer are covered by the overlying tape layer.

---

This invention generally relates to reinforced structures and more particularly relates to fiber reinforced structures having controlled physical characteristics and to methods for the simple and inexpensive manufacture of such structures.

The numerous advantages of composite bodies having fibrous reinforcing elements are evident from the widespread and increasing usage of such bodies. One general class of structures of this type is typified by synthetic plastic members having glass fiber reinforcement, such structures having come into wide use because of their low cost, relatively high strength-to-weight ratios, chemically inert character and the ease with which they may be formed into given shapes. The high strength of such structures results from the fact that the fiber properties are communicated to a degree to the plastic or other matrix within which they are contained, while the matrix protects the individual fibers and unifies the mass.

The present invention is not limited to plastic bodies having glass fiber reinforcements, but is described in this context because of the versatility of such structures. It is to be expressly understood, however, that the invention may be utilized with any suitable composite structure, including organic, inorganic, synthetic and naturally formed matrices and fibers.

As the art of fabricating fiber reinforced composite structure has progressed, it has been determined that fiber orientation is of appreciable significance to physical properties. Obviously, the presence of short discontinuous fiber elements at random orientation within a matxir cannot create the same resistance to a given stress as an equivalent amount of continuous fibers properly oriented relative to the stress. Thus, while short, random or only partially oriented fibers are utilized for low cost applications involving relatively low physical forces, such as common household products, specific fiber orientations are used when a greater strength-to-weight ratio is desired.

The most obvious expedient is to weave the fibers into a fabric, thus achieving specific strengths in substantially othogonal directions. However, often fabric materials are woven at substantial expense from roving materials or other continuous fibers, and generally must be manually laid up into a given shape. Proper forming does not assure adequate strength, however, because the fiber orientations required may not be correct for the internal stresses encountered. Furthermore, the fibers in woven materials are inherently sinuous, and not as strong as when flat.

For given specific structures, maximum strength is achieved through the use of special techniques. The body of a large cylindrical pressure vessel, for example, may be subjected to both radial and axial forces of high magnitude, and therefore requires high strengths in all directions. Fabric materials do not afford the needed strength uniformity unless reinforcing layers are used. Moreover, fabric layers must often be specially cut and formed in order to define a desired shape without wrinkling.

Higher strengths and greater uniformity are achieved by filament winding, which disposes continuous fibers about the body. For a cylindrical vessel, the filaments are usually wound to follow geodestic paths around the vessel surface. To obtain uniform layers and surfaces, precision mechanisms are generally employed for filament winding. The winding machines are often extremely complex, because the work piece and winding mechanisms must both be moved concurrently and in precise relation to each other. Typically, a filament winding machine for fabricating large bodies or vessels requires a rotatable mandrel and a special bed with a carriage mechanism for moving the filaments from the supply area and about the mandrel in a programmed fashion.

While it is highly desirable to use nonwoven but oriented fibers in these composite structures, filament winding may not be economically feasible for a specific winding application. A filament winding machine may not be usable in any event if the structural configuration of the part does not provide a suitable geodesic path. For such operations, a manual lay-up of continuous roving may be required, although it may be extremely difficult to handle.

There is, therefore, a need for composite structures and methods of producing such structures that permit the disposition of nonwoven oriented fibers within complex bodies by both manual techniques and inexpensive machinery. When formed, such bodies should have fiber orientations which are best disposed for the stresses introduced into the structure of which they are a part, and should be inherently stable in position. The lay-up process should be rapid and involve a minimum wastage of raw material, and the finished part should be smooth and uniform.

It is therefore an object of the present invention to provide a new method for fabricating composite structures.

A further object of the present invention is to provide an improved composite structure utilizing nonwoven oriented fibers.

Yet another object of the present invention is to provide improved composite structures having physical properties approaching those of filament wound structures but fabricated by inexpensive machinery.

These and other objects are achieved by structures and methods in accordance with the invention which utilize selected nonwoven fiber tapes. Each tape comprises what may be termed a "cross-ply" construction, with one ply or sheet oriented along the length of the tape, i.e., consisting of longitudinal fibers, and the second ply or sheet consisting of transverse or partially transverse fibers, that is, a sheet of fibers disposed at a desired and preselected angle relative to the longitudinal axis of the tape. The tapes are utilized by disposing them in interlocking fashion within successive tape layers.

In composite structures in accordance with the invention, cross-ply tape may be wound by machine in either a polar (end to end) direction, or an in-plane direction. Depending upon the configuration of the part, and the stresses to be applied, an optimum orientation may be selected for the sheets of transverse fibers. Where the configuration of the product demands, a particular section of the product may be laid up by hand so that stress resistance can be optimized by utilizing carefully selected orientations of the layers of tape and the tape plies or sheets. Such an arrangement permits a simple winding mechanism to be employed for the fabrication of complex bodies because substantially any rotating madrel system can be utilized. The formed part is nonetheless uniform and has a smooth surface.

A specific example of a product in accordance with the invention is one that is capable of withstanding high pressures. A substantial thickness of layers of cross-ply glass fiber tape is built up by wrapping the tape lengthwise about the circumference of the body, with the sheet of transverse fibers lying at a desired angle to the sheet of longitudinal fibers. The tape itself comprises a longitudinal layer of glass fibers and a transverse layer of glass fibers. The latter layer may have about the same thickness and weight and about the same number of fibers as the longitudinal layer. Alternatively, for the purposes of the present invention, the longitudinal layer may have a different thickness and/or number of fibers than the transverse layer. Layers of the tape are built up on the body in successive pairs, with one layer of tape in a pair being inverted relative to the other layer of tape so that the sheets of transverse fibers in adjoining layers of tape are in facing relation. Moreover, the successive turns of a given layer of tape are in abutting relation so that each sheet within a given layer is continuous. In addition, the tape from each successive layer overlaps two adjacent turns of the tape of the next preceding layer by at least an amount sufficient to fully strengthen the underlying layer at the lines of abutment of the successive turns thereof. After a pair of layers is disposed on the body by advancing individual turns from one end of the body, the next pair of layers is disposed on the body by advancing the individual turns from the opposite end of the body. In this manner, the continuous longitudinal sheets provide substantial hoop strength, and the continuous transverse sheets provide longitudinal or axial strength. Although the transverse fibers within a given section of each tape are relatively short, the overlapping relation of successive turns, the controlled orientation of the fibers, and the use of interlaminar shear resistance provide a substantial proportion of the longitudinal strength that is achievable with continuous fiber winding. Extremely large structures can be constructed in this manner with relatively low cost equipment and with relatively high strength. Usually, in pressure vessel constructions and the like, the total number of longitudnial fibers exceeds the transverse fibers, i.e., a ratio >1:1 usually is desired. This is to increase hoop strength with respect to longitudinal strength. Often a ratio up to 2:1 or more is employed. This ratio can be achieved by increasing the number of fibers per unit area in the longitudinal fiber-containing portion of the tape and/or increasing the thickness of that portion of the tape. Alternatively, extra layers of longitudinal fibers, such as rovings, can be incorporated with the structure. Methods in accordance with the invention utilize cross-ply tapes having the desired fiber sheet orientation, and a combination, as necessary, of automatic winding of the body in one plane or the other, together with hand lay-up of specific segments. Thus, for a complex shape, continuous winding and manual lay-up are combined in expeditious fashion to achieve high stress tolerance in the finished tape wrapped body. A specific example of a structure formed in this manner in accordance with the invention is a wingbox beam for an airframe. It will be understood that in most instances the described fibers are disposed in a resin matrix which is fully cured at some point during fabrication of the structure.

A better understanding of the invention may be had by reference to the following description, taken in conjunction with the accompanying drawings, in which:

FIGS. 3 through 6 are enlarged schematic fragmentary side views of the vessel of FIG. 1 during successive steps in the fabrication of the vessel;

FIG. 8 is a schematic fragmentary perspective view of the disposition of dual cross-ply tape layers in the arrangement of FIG. 1;

FIG. 9 is a schematic fragmentary perspective view showing an alternative arrangement to FIG. 8;

FIGS. 11 through 14 are simplified sectional views of an airframe wingbox, showing successive stages in the fabrication thereof;

Figure 1:
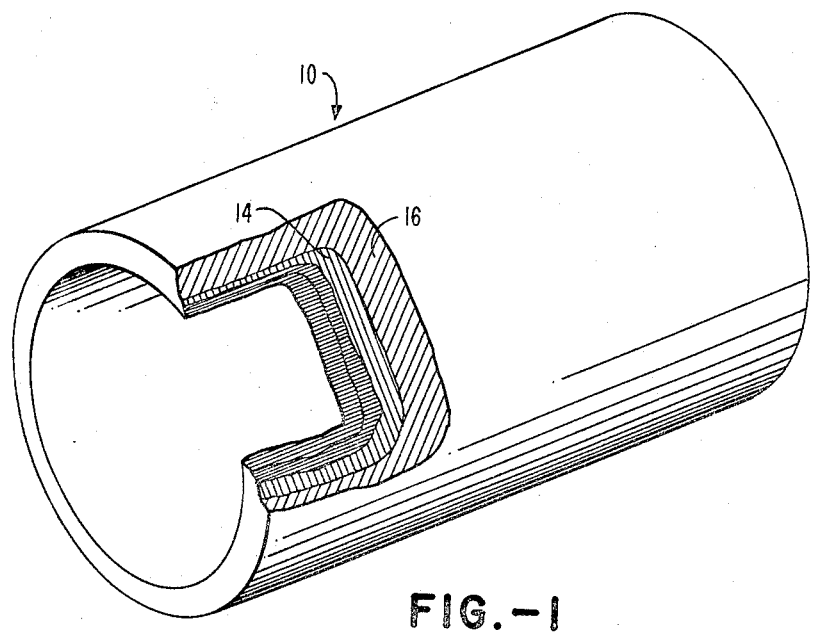
FIG. 1 is a schematic perspective view, partially broken away, of a cylindrical high pressure vessel in accordance with the invention.

An example of a composite structure fabricated in accordance with the present invention is illustrated in schematic perspective view in FIG. 1. The structure comprises a thick-walled vessel or cylinder 10, such as can be used at extremely high pressures. A structure of this type can be fabricated of a conventional resin system, such as epoxy or phenolic resin, reinforced by glass fibers or the like. While the shape shown, that of a circular cylinder, is not truly illustrative of the range of complex shapes in which structures can be fabricated in accordance with the invention, cylinder 10 illustrates other aspects of the invention.

Structure 10 is uniform in cross-sectional shape and is intended for use primarily under compressive loads, such as those which are encountered at extreme ocean depths. This cylindrical structure of approximately 8 inches in thickness can withstand pressures existing at 20,000 foot depths and more, for example. Alternatively, if used as a high pressure vessel, the structure can withstand high tensile loads. If this type of body is extended to long length and used in vertically hanging fashion, as for tubing for large diameter wells, more complex stress distributions are encountered. Nevertheless, high levels of axial as well as hoop stress can be withstood without failure of the structure.

Figure 2:
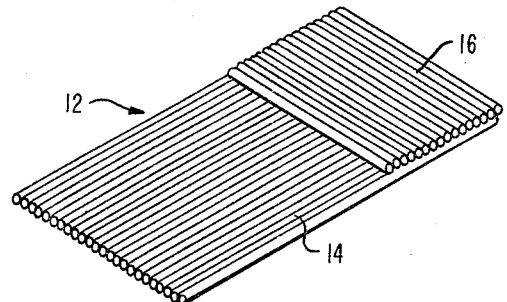
FIG. 2 is an enlarged schematic perspective view of a fragment of a cross-ply tape for use in the arrangement of FIG. 1 showing the tape with part of the transverse fibers removed for clarity.

In accordance with the invention, the structure 10 of FIG. 1 is built up of successive pairs of layers of nonwoven oriented fiber tape. Each tape layer consists of successive abutting turns of a cross-ply tape 12, as best seen in the simplified fragmentary view of FIG. 2. In each tape layer there are two superposed sheets of fibers, as previously described, disposed in a resin matrix, one sheet comprising longitudinally oriented fibers and the other sheet comprising transverse or angle oriented fibers. Note that the fibers have been greatly enlarged and are depicted in FIG. 2 as being individually uniform, even though in practice each sheet of the tape is formed of minute strands of fibers of varying diameter collected to a predetermined number of fibers and has a thickness usually greatly exceeding the diameter of individual fibers. Ordinarily, 150–600 END/inch tape is used, where an END is defined as 204 fibers. Most commonly, 200 END/lineal inch tape is used for many applications.

Although the tape 12 is not woven, the fibers are oriented because the tape consists of the two relatively thin sheets within each of which all fibers are substantially parallel to one another. In the base sheet 14 illustrated in FIG. 2, the fibers are substantially continuous and substantially parallel to the longitudinal axis of the tape 12. The sheet 14 can be formed in any suitable manner, as by spreading out fiber oriented roving material to the desired width and thickness, then resin coating (impregnating) the sheet or tape. The tape also includes a sheet 16 comprising fibers oriented transversely, or at least partially transversely, to the longitudinal axis of the tape 12. The sheet 16 of transverse fibers also can be formed by spreading out impregnated material. The tape 12 is formed by assembling sheets 14 and 16 together and then cutting the combined sheet material into tapes of the desired transverse dimension. Orientation of sheets 14 and 16 with each other is accomplished before such cutting is carried out. In the examples shown in the drawings the sheet 16 with its transverse fibers is orthogonal to the sheet 14 with its longitudinal fibers. During fabrication of the tape 12, the two sheets 14 and 16 comprising the longitudinal and transverse fibers, respectively, can be pressed together at a slightly increased temperature, in order to unify the tape 12 before it is utilized in the structure 10.

The tape 12 can be fabricated of any suitable material, for example, solid glass fibers, hollow glass fibers, silica fibers, carbon fibers, graphite fibers, refractory metallic oxide fibers, such as zirconia and the like, etc. Moreover, each sheet of the tape 12 can be identical to or differ from the other with respect to the single sheet or multiple types of fiber materials from which the particular sheet is prepared. For most purposes, however, both sheet 14 and 16 of the tape 12 will be of substantially the same fiber material and impregnated with the same or very similar curable resin systems. Moreover, within each such sheet one type of fiber is usually employed. The present invention does contemplate the use, however, of a plurality of such fibers within any given sheet or sheets of any given tape or tapes within the structure 10. The fibers necessarily must provide adequate strength, length, durability, and/or high temperature and other characteristics as are desired for the finished structure. It will be further understood that more than two fiber oriented sheets such as 14 and 16 can be utilized in forming a given tape. For purposes of clarity in description, reference hereinafter will be made only to tapes containing only two sheets.

Figure 10:
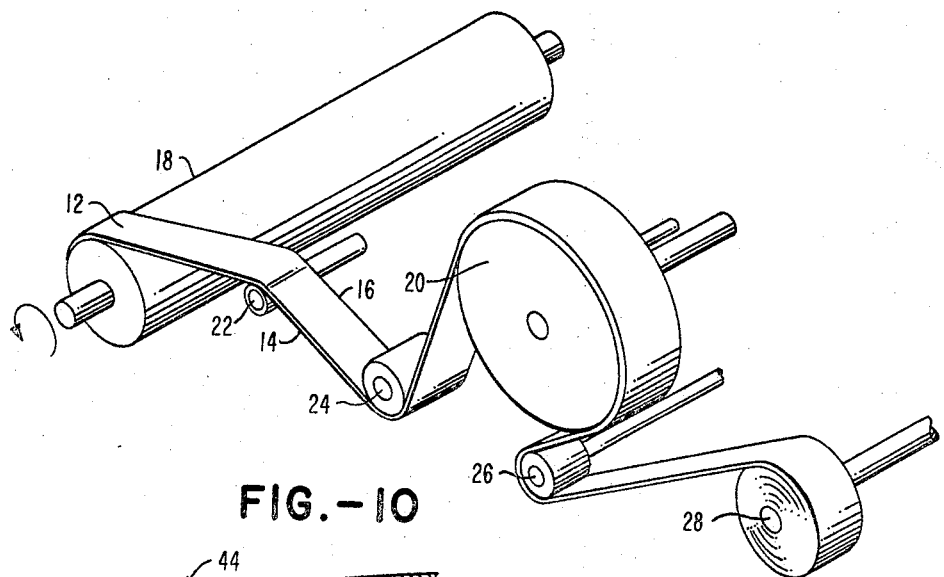
FIG. 10 is a simplified diagrammatic representation of illustrative machinery for use in winding cross-ply tape into composite structures in accordance with the invention.

In fabricating the vessel 10, a tape winding operation is carried out on a mandrel. The tape 12 is oriented with respect to the mandrel such that the innermost sheet of the first layer of tape 12, i.e. the sheet which abuts the mandrel surface, is sheet 14 comprising the fibers orientated along the longitudinal axis of the tape 12. Typical apparatus for carrying out the tape winding is schematically illustrated in FIG. 10 of the drawings. Thus, a mandrel 18 is illustrated having outer dimensions corresponding to the inner dimensions of the vessel 10 to be fabricated. The mandrel 18 is adapted to rotate around its longitudinal axis. The machinery illustrated schematically in FIG. 10 also includes a large roller 20 adapted to be connected to a tape advance carriage (not shown) for advancing the tape along the length of the mandrel during the tape winding operation, and auxiliary tensioning rollers 22, 24 and 26 and tape supply 28, all of which can also be connected to a tape advance carriage (not shown). It will be understood that any other suitable equipment for the tape winding operation can be used. Generally speaking, relatively simple inexpensive equipment can be successfully employed.

Figure 3:
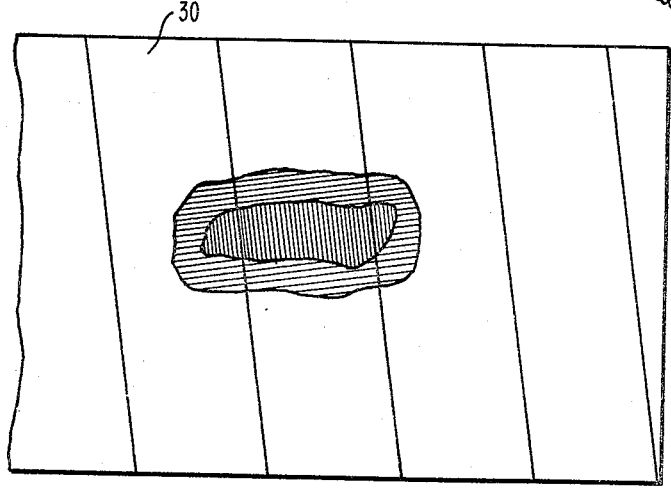

When the tape wrapping or winding operation illustrated in FIG. 10 is initiated in the fabrication of structure 10 or other similar structures, the tape 12 is applied directly or adjacent to one end of the mandrel 18 at an angle to the radial circumference of the mandrel, as shown in FIG. 10, so that the tape 12 can be wound as a continuous layer on the mandrel 18 by rotating the mandrel about its longitudinal axis in a direction which draws the tape 12 from the supply roll 28. This is also illustrated in FIG. 3 in side elevation. During rotation of the mandrel 18, the tape 12 passes onto the mandrel 18 so that successive turns abut each other until the whole surface of the mandrel is covered from one end to the other by a layer 30 of the tape 12. This is shown in FIG. 3. The tape winding can be carried out at any suitable winding tension, for example, about 0.25–0.50 lb. per END with a total winding tension for 200 END/lineal inch tape of 50–100 lbs. It will be understood that other suitable tensions can be used.

Figure 4:
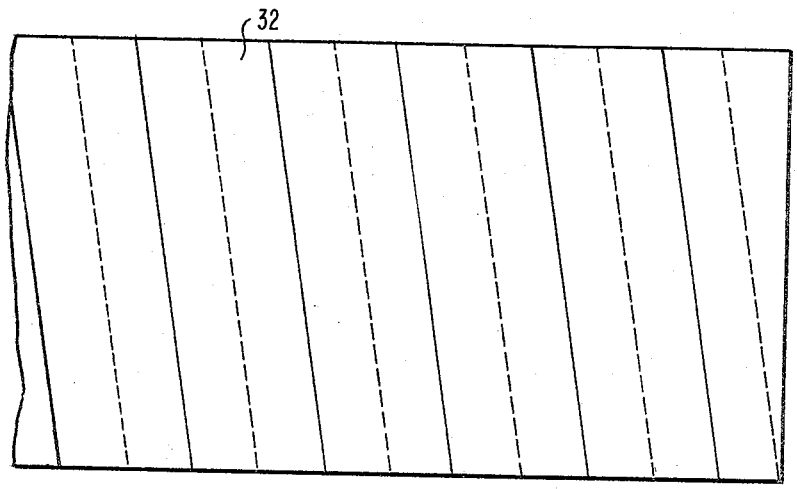

The tape is then cut and the mechanism is adjusted so that a second layer of tape can be applied. The first layer 30 of tape 12 provides a substantially continuous sheet 14 of essentially continuous (longitudinal) fibers and a substantially continuous sheet 16 of discontinuous (transverse) fibers throughout the whole length of the body being formed. The next layer 32 of tape 12 is applied, as illustrated in FIG. 4, by the same procedure as that for layer 30, i.e. at the same angle as the first layer 30 of the tape 12, and beginning at the same end of the mandrel as in the application of the tape layer 30. However, the layer 30 is overlapped by the tape 12 of the layer 32 so as to cover the abutting edges of adjacent turns of the tape 12 in the layer 30. As shown in dotted outline in FIG. 4, each turn of the layer 30 is overlapped approximately one half its width by a given turn of the tape 12 of the layer 32. Such overlapping has the effect of substantially improving the strength and uniformity of the body being formed on the mandrel. It will be understood that other amounts of overlap can be employed if desired. Moreover, the tape 12 when applied as layer 32 over layer 30 is orientated so that the sheet 16 of the layer 32 faces and adjoins the sheet 16 of the layer 30. The two adjoining layers 30 and 32 of the tape 12 with their contacting sheets 16 form a pair 34.

Figure 5:
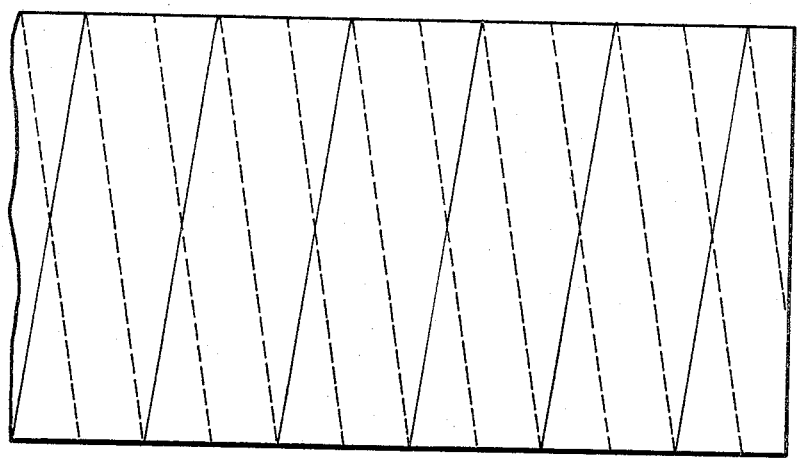
Figure 7:
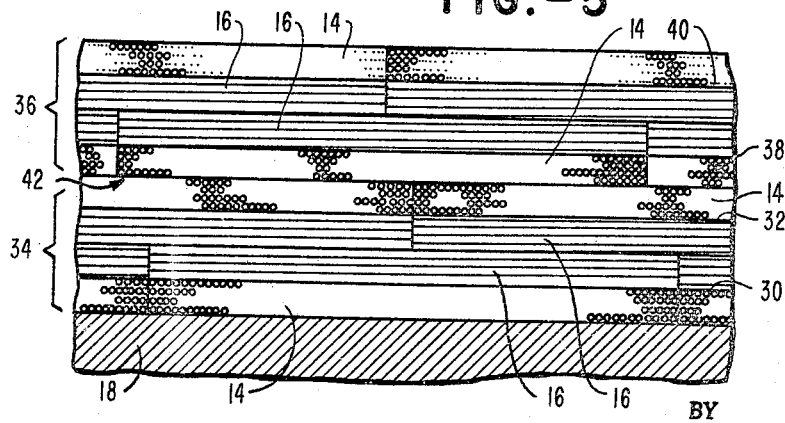
FIG. 7 is an enlarged schematic side sectional fragmentary view of the structure of FIG. 1 showing the disposition of the fibers therein.

In accordance with the invention, the next pair of layers 36 of tape 12 is wound on the mandrel in the same manner as with pair 34 comprising layers 30 and 32, but from the opposite end of the mandrel and workpiece and at an angle from the radial circumference of the mandrel which intersects the angle at which the tape 12 of layers 30 and 32 of pair 34 was wound on the mandrel 18. This is clearly shown in FIG. 5 of the drawings wherein the adjacent turns of layer 32 are illustrated in dotted outline and wherein adjacent turns of a layer 38 of the second pair 36 of layers to be built up on the mandrel are illustrated in solid outline disposed over the layer 32. Such winding can be accomplished by reversing the mandrel 18, end for end, in the winding machinery before winding of layer 38 is initiated, or by any other suitable procedure. As shown in FIG. 7, a side elevation of a portion of the structure 10, the successive turns of tape 12 are abutted together to form the continuous layer 38. It should be noted that when the tape 12 is applied to the mandrel 18 in forming the first layer, layer 38, or the second pair 36, it is oriented with respect to the sheets thereof in the same manner as was the first layer 30 of the first pair 34, i.e. with the sheet 14 thereof facing toward the mandrel.

The second layer, 40, of the second pair 36, is applied in exactly the same manner, at the same angle and from the same end of the mandrel 18 as the first layer 38, but overlaps the first layer 38 so that the lines between adjacent turns of layer 38 (illustrated in dotted outline in FIG. 6) are fully covered by the turns of tape 12 of layer 40 (illustrated in solid outline in FIG. 6). This is comparable to the manner in which layer 32 overlies layer 30. It should also be noted that layer 40, as with layer 32, is applied over layer 38 so that sheet 16 of layer 40 faces and contacts sheet 16 of layer 38. Thus, the second pair 36 of continuous layers of tape 12 is formed over the mandrel 18.

The foregoing tape winding procedure can be duplicated for succeeding sets of two pairs each of tape layers, the sheets 14 of each layer within any given pair adjoining each other and the two pairs of each set being wound on the workpiece on the mandrel 18 from opposite ends thereof in the previously described manner. One such set 42 is illustrated in cross-section in FIG. 7, comprising the pairs 34 and 36, pair 34 comprising layers 30 and 32 and pair 36 comprising layers 38 and 40. The orientation of the sheets 14 and 16 within the various layers of the set is clearly illustrated in FIG. 7. FIG. 8 also schematically illustrates the particular orientation of the individual fibers within each sheet 14 and 16 of the tape layers 30 and 32 forming the first pair 34, and also depicts the manner in which adjacent turns of tape 12 in layer 32 overlap those of layer 30. An alternative embodiment of cross-ply tape and a portion of a structure being built therefrom is schematically illustrated in FIG. 9, wherein a tape 12a is employed, comprising a sheet 14a of longitudinally oriented fibers and an adjoining sheet 16a of fibers oriented at an angle of 45° to those of sheet 14a, instead of an angle of 90° as in the case of the orientation of the fibers of sheet 16 with respect to those of sheet 14. It will be noted from FIG. 9 that the manner of tape winding is identical with that described for tape 12, since the pair 34a of tape layers is formed with sheet 14a of layer 30a as the base sheet and with sheet 16a of layer 30a and sheet 16a of layer 32a abutting each other. Moreover, the adjacent turns of tape 12a of layer 32a overlap those of tape 12a of layer 30a, as in the previously described manner with respect to layers 32 and 30 and layers 40 and 38.

The composite structure 10 can, therefore, be formed very readily on any conventional winding machine having means for rotating a male die. The winding mechanism need only consist of a longitudinal advance for the tape feed, inasmuch as orientation of the fibers is selectively controlled by choice of the angle of the cross-ply tape. It will readily be appreciated that the winding machine may either operate in the polar direction (i.e. end to end) for a suitable geometric shape, or in the in-plane direction, i.e. the plane transverse to the longitudinal axis of the structure. The machine need only be operated to wind the tape from one end of the structure to the other, at which point the tape is cut, inverted, and returned to the start. When the second layer of any given pair is wound, the turns of the second layer are caused to overlap those of the first to provide retention and interlock, as previously described.

Practical structures fabricated in accordance with the described procedure have been found to have hoop and longitudinal or axial strengths which are substantial proportions of those theoretically achievable with filament wound structures. These results are achieved partly because of the of the straightness of the fibers within each sheet of the tape, as illustrated in FIGS. 8 and 9, partly because of the precise control which is achieved over the orientation of the sheets and fibers of the sheets, as clearly shown in FIG. 7 and partly because of the combined characteristics of composite structures. Although the sheets 16 of transverse fibers in the tape 12 are disposed along the longitudinal axis of the structure 10, as previously described, and are therefore required to withstand the majority of the axial and longitudinal stresses, substantial strength is achieved in this direction through interlaminar shear resistance between the adjoining sheets 16. Thus forces acting on the structure 10 are transmitted through the matrix into the two abutting sheets 16 of relatively short fibers disposed in adjacent paired layers of the tape 12. Because the tapes in each pair of tapes are arrranged so that the upper overlaps the lower or first-wound of the pair, the two adjoining transverse fiber sheets 16 of each pair have the transverse fibers overlapping so that there is no substantial discontinuity in the two sheets 16 and so that they essentially act as one solid continuous sheet for maximum longitudinal strength. Thus, the strength characteristic of the matched sheets 16 and, indeed, all matched pairs and sets of the tape 12 is a substantial part of that which would be achieved if the structure were fabricated by filament winding, i.e. by using truly continuous fibers.

As will be more fully appreciated in conjunction with the description of more complex structures below, the fabrication technique described in connection with structures 10 of FIGS. 1–8, inclusive, permits structures to be formed upon male dies, of particular importance with respect to extremely large units and units which are required to have machined outer surfaces.

One manner in which a complex structure in accordance with the invention can be formed is shown in the embodiment illustrated in FIGS. 11–16. The embodiment illustrated in FIGS. 11–16, inclusive, is used for almost diametrically opposed purposes to those represented by the extremely high pressure vessel of FIGS. 1–4, inasmuch as the embodiment of FIGS. 11–16, inclusive, comprises a wingbox beam 44 for an airframe, in which weight must be minimized but strength maximized in accordance with the complex stresses which the beam must undergo. The convolutions of a wingbox, as well as the stresses to which it is subjected, provide critical demands on fiber orientation and stress properties. Filament winding is not suitable for fabrication of wingbox beams, inasmuch as there is no geodesic path which can be followed, so that the filament fibers are apt to slip after the winding operation, unless retaining means are used. Moreover, the complex configuration of a wingbox beam requires hand lay-up of at least some portions of the structure and filament winding is not adapted for use with manual lay-up.

Figure 15:
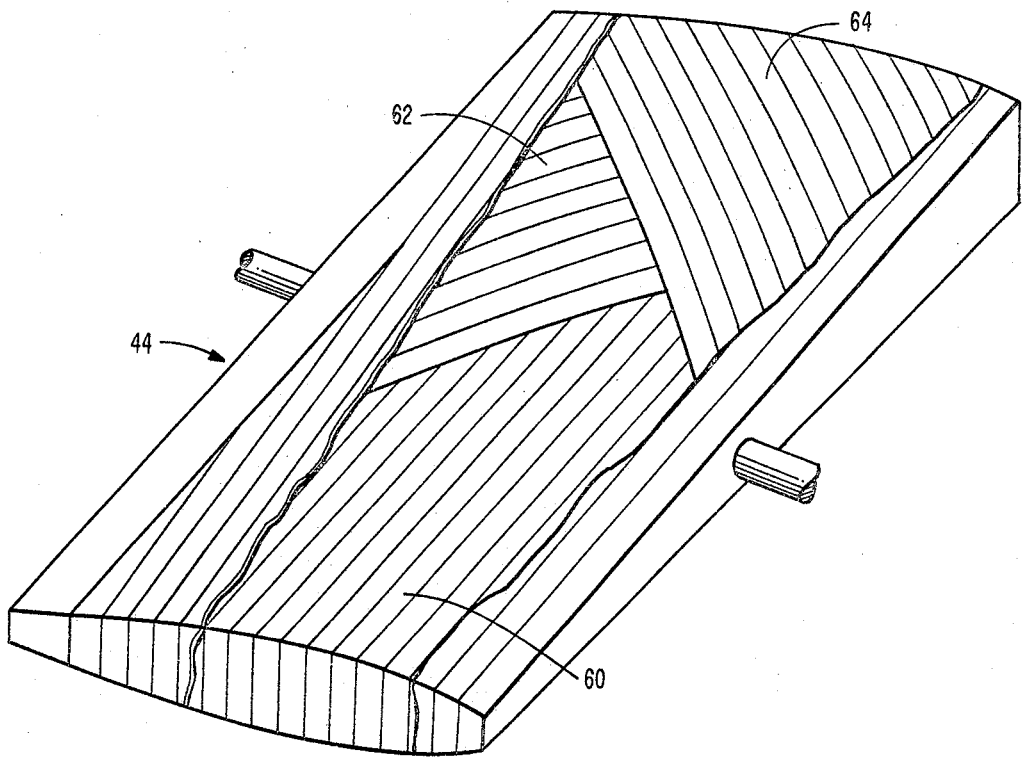
FIG. 15 is a simplified perspective view of a portion of the airframe wingbox at an intermediate stage in fabrication.
Figure 16:
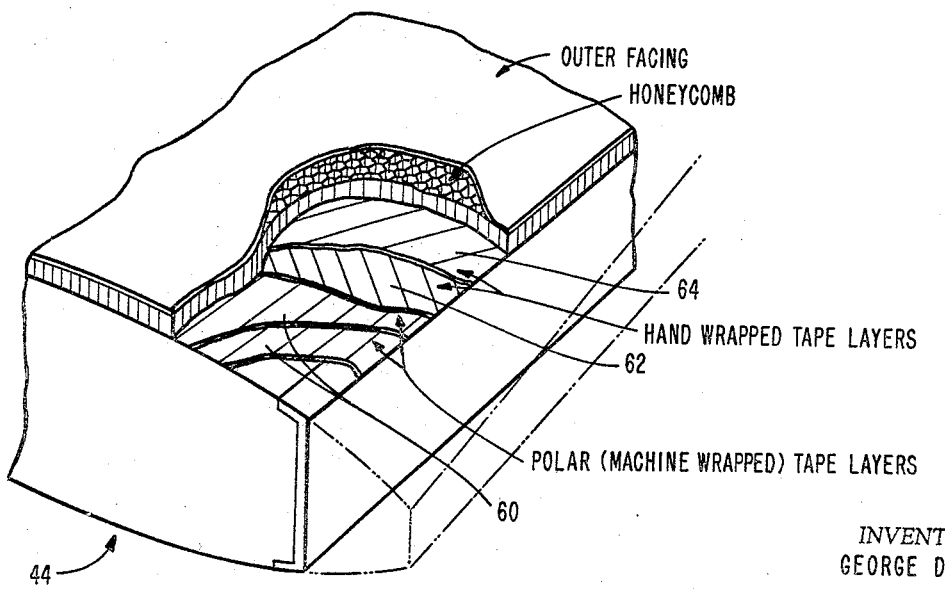
FIG. 16 is a schematic fragmentary perspective view, partially broken away, of the airframe wingbox of FIGS. 11-15 after completion.

As illustrated in FIGS. 11–16, inclusive, particularly FIGS. 15 and 16, a wingbox beam 44 is formed which is tapered along the air foil from the leading edge to the trailing edge, and also outwardly along the air foil in the direction of the chord of the wing. This complex structure is provided, in accordance with the invention, by a combination of automatic winding and hand lay-up techniques which permit the improved selective insertion of reinforcing members.

Figure 11:
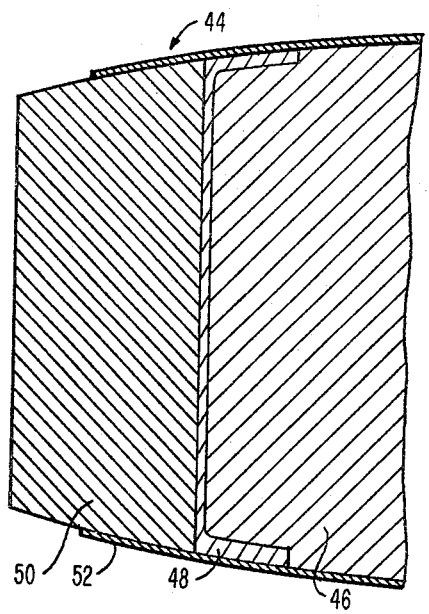

As shown in FIG. 11, the wingbox beam 44 is formed through the use of a central male mandrel conforming to the size and shape of the hollow interior of the desired wingbox beam 44. A prefabricated spar 48, such as plastic, etc. is disposed on the leading edge of the mandrel 46 and a similar spar (not shown) is applied to the trailing edge of the mandrel 46. Each spar extends along a portion of the longitudinal edges of the mandrel 46, as shown in FIG. 11. Neither spar is joined physically to the mandrel 46. A mandrel insert 50 is temporarily abutted to the opposite surface of each spar. In FIG. 11, insert 50 is shown abutting spar 48. Thereupon, in a first wrapping step, an inner layer of cross-ply oriented resin-impregnated glass tape or the like containing two or more sheets comparable to sheets 14 and 16 of tape 12 is wrapped in a polar fashion about the composite mandrel structure (mandrel 46 and inserts 50) which also includes the internal spars 48, to form a skin layer 52. Adjacent turns of the tape abut each other so that sheets comparable to sheets 14 and 16 therein are continuous.

Figure 12:
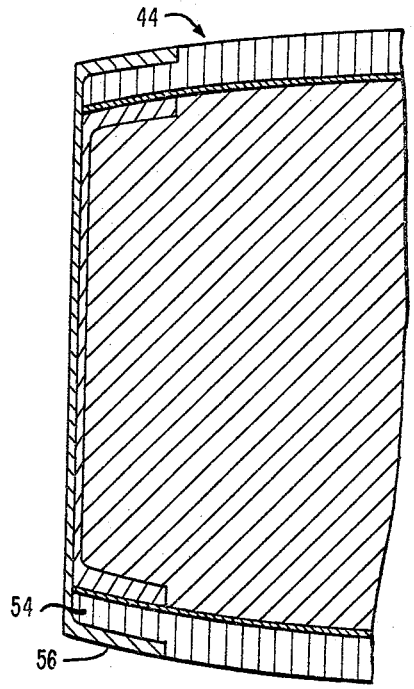

During such polar wrapping step, the mandrel 46 and the adjoining inserts 50 at the leading and trailing ends thereof are wrapped over with the cross-ply tape material forming the skin 52. Those portions of the skin 52 which extend over the inserts 50 are then trimmed away, and a honeycombed core 54 is then positioned over the top and also the bottom surfaces of the wing, as shown in FIG. 12. The cores can be of any suitable expanding material, such as plastic, aluminum, etc. The cores 54 are adapted to receive spars 56 over the leading and trailing edges thereof. The spars 56 also extend along the longitudinal edges of the cores 54 and such spars 56 are then secured in place, as shown in FIG. 12. Thereafter, the mandrel inserts 50 are reinserted, as shown in FIG. 13, together with appropriate tapered pieces 58 on the top and bottom sides of the structure. Thereupon, a second polar wrapping operation is carried out in the same manner to provide an outer layer of the same cross-ply oriented tape in the form of a protective skin 60, shown in FIG. 13. Thereafter, the structure 44 can be unified by curing the resin in the tape in a conventional cure step. Preferably but not necessarily, smooth metal caul sheets (not shown) are placed over the top and bottom surfaces of the wing section during the curing step, in order to provide the desired surface finish.

The final step includes the removal of the inserts 50 and 58 from the leading and trailing edges of the structure 44, the trimming of the excess wound tape material from the outer spars 56 and such machining as is desired to regulate the size and shape of the structure 44. The wingbox mandrel is also removed, leaving the completed structure 44 in the form shown in FIG. 14.

It will be noted that in the wingbox beam illustrated in FIG. 15 two additional outer tape layers 62 and 63 are provided, which layers are at 45° angles from the poles and at 90° angles from one another. For such purposes, nonwoven cross-ply tape such as tape 12 or tape 12a utilizing a resin impregnation system can be employed. The tape wrapping is carried out in the previously described manner and either automatically or manually in order to provide substantial strengthening of the structure 44 in the wrap directions. It will be understood that such direction oriented lay-up can be carried out in forming the skin 52 as well as the skin 60. Curing of the tape layers 62 and 64 is carried out simultaneously with that of skins 52 and 60, or subsequently. A portion of a typical finished wingbox beam 44 incorporating the described components is set forth in FIG. 16. Thus, the wingbox beam 44 includes the honeycomb 54 disposed directly over the layer forming the skin 52. Moreover, the outer skin comprises the layers 60, 62 and 64.

The wingbox beam 44 illustrates that cross-ply tape can be selectively machine and hand-wrapped in the fabrication of components which may also incorporate other items and techniques of fabrication. Moreover, the described tape wrapping technique not only permits the use of both machine and hand lay-up procedures in any described combination, but also provides direct control over the orientation of the fibers within the structure being formed. Because tape materials are employed, the winding and lay-up can be accomplished rapidly and smoothly. The inclusion of the spars 48 and 56 is consistent with the requirements of the final wingbox beam 44, inasmuch as the fiber orientations, if any, within the spars are generally entirely independent of the fiber orientation required for the surface panels.

While there have been described above and illustrated various forms of tape-wound structures having controlled fiber orientations, and methods for producing the same in accordance with the invention, it will be appreciated that the invention is not limited thereto, but includes all modifications and variations falling within the scope of the appended claims.

What is claimed is:

1. A composite structure having a non-woven oriented fiber reinforcement, said reinforcement comprising a plurality of layers of tape windings, each layer consisting of successive abutting turns of non-woven oriented cross-ply fiber tape, said tape comprising two joined sheets, one of said sheets comprising substantially continuous longitudinal fibers and the other of said sheets comprising at least partially transverse fibers, said layers being disposed in pairs in said reinforcement with the sheets comprising the at least partially transverse fibers in each said pair being in facing relation to each other, the turns of one layer of a pair overlapping the turns of the other layer of the pair, whereby the lines of abutment of the turns of the underlying layer of each pair are covered by the tape forming the other layer of each pair.

2. The composite structure of claim 1 wherein said tape is resin-impregnated, and wherein said layer is resin-cured to fully stable rigid form.

3. The composite structure of claim 1 wherein both layers within each said pair are wound from the same end in forming said reinforcement, wherein successive pairs of layers alternate with respect to the end of the structure from which they are wound in a manner such that the lines of abutment of the turns of tape forming abutting layers of successive pairs intersect for improved reinforcement.

4. A fiber tape reinforced wing box beam structure, said structure comprising at least one layer of a cross-ply non-woven oriented fiber tape disposed along the span axis of the wingbox beam to form a primary structure, said layer being formed of a plurality of successive abutting turns of said tape, said tape comprising two sheets of fibers, one of each sheets comprising fibers extending along the longitudinal axis of said tape and the other of said sheets comprising fibers extending at an angle to the longitudinal axis of said tape, at least one layer comprising abutting successive turns of said cross-ply non-woven oriented tape disposed about the wingbox beam structure, a span member disposed within the wingbox beam structure, and means mechanically closing the outermost edge of the wingbox beam.

5. A method of fabricating complex fiber-reinforced composite structures which method includes providing at least one pair of selected layers by winding a first layer of cross-ply non-woven oriented fiber tape on a male die at an angle from the radial circumference of the die, and with successively abutting turns such that a substantially continuous layer of the tape is disposed over the die, the tape comprising at least two substantially co-extensive sheets, one of which comprises fibers extending along the longitudinal axis of the tape and another of which comprises fibers extending at an angle to the longitudinal axis of the tape, the tape being oriented with respect to the die such that the sheet comprising the longitudinally extending fibers is disposed adjacent to the die, and winding cross-ply non-woven oriented fiber tape comprising said sheets over the first layer to provide successive abutting turns forming a substantially continuous second layer oriented such that the sheet thereof comprising at least partially transverse fibers abuts the same type of sheet of the first layer, the tape turns of the second layer being displaced along the die to cover the lines of abutment between adjacent tape turns of the first layer so as to improve the strength of the pair, and continuing the winding of pairs of said layers until a desired thickness has been attained.

6. The method of claim 5 wherein both layers of a given pair of layers are wound on the die from the same direction and wherein each two successive pairs of layers form a set, the pairs within each set differing in the direction from which they are wound on the die, the lines of abutment of adjoining layers of respective pairs in each set intersecting to provide improved structural strength.

7. A method of providing a fiber reinforced plastic wingbox beam for an aircraft, which method includes attaching leading and trailing edge spar sections to opposite ends of a wingbox type mandrel, attaching leading and trailing edge mandrel inserts on the exposed ends of the spar members opposite the mandrel, wrapping successive turns of a cross-ply non-woven glass fiber, resin impregnated tape in a direction parallel to the lateral dimension of the wingbox beam over the mandrel and spar members and at least partially over the mandrel inserts along the leading and trailing edges thereof to form an inner skin, adding selected individual lengths of non-woven glass fiber resin-impregnated tape at selected positions and in selected directions across the continuously wound layers, removing the mandrel inserts and trimming excess wound material from the product thus provided, placing honeycomb core panels on the top and bottom surfaces of the panels thus formed on the mandrel, inserting additional leading and trailing edge spar members adjacent the previously inserted spar members and joining the core material, adding mandrel inserts along the newly inserted spar members, longitudinally winding an outer layer of non-woven cross-ply glass fiber resin-impregnated tape to form an outer surface, curing and densifying the structure into a composite unit, removing the wingbox mandrel and the mandrel inserts, and trimming excess material from the part thus formed.

References Cited

UNITED STATES PATENTS 2,854,031  9/1958  Donaldson.
3,112,895  12/1963  Kinney _____ 156—425 XR
3,115,271  12/1963  Anderson et al. __ 161—57 XR ROBERT F. BURNETT, Primary Examiner WILLIAM A. POWELL, Assistant Examiner U.S. Cl. X.R.

138—144; 156—191, 193; 161—68, 156; 244—119